United States Patent [19]

Kaufmann

[11] 4,216,468
[45] Aug. 5, 1980

[54] FLOOD WARNING DEVICE

[76] Inventor: Harold Kaufmann, 1919 Sixth Ave. NE, Rochester, Minn. 55901

[21] Appl. No.: 940,882

[22] Filed: Sep. 11, 1978

[51] Int. Cl.² ............................................. G01F 23/10
[52] U.S. Cl. ..................................... 340/620; 340/616
[58] Field of Search ............... 340/52 F, 59, 603, 612, 340/616, 618, 620

[56] References Cited

U.S. PATENT DOCUMENTS

| | | | |
|---|---|---|---|
| 1,164,882 | 12/1915 | Sommer | 340/620 |
| 3,069,671 | 12/1962 | Taylor | 340/620 |

*Primary Examiner*—Alvin H. Waring
*Attorney, Agent, or Firm*—Norman Lettvin

[57] ABSTRACT

An alarm for signalling the rise of water above a preselected flood indicative danger level. In a preferred embodiment, the alarm is connected across the terminals of the smoke sensing unit of a commercial smoke detecting and signalling device. The alarm includes a pair of elongated conducting wires extending from the smoke sensor terminals to a remote area at which it is desirable to sense a rise in water above the preselected danger level. The ends of the wires at the remote area are fixedly attached to a non-conductive head element so as to provide a separation space between the wires. A rise in the water level to the preselected level serves to bridge the space separating the ends of the wires, closes the circuit and activates the warning signal. In a preferred, alternate embodiment, the wires fixedly attached, in spaced relation, to the wire separating head element, are connected in series with a power supply and a signal. The signal is activated at such times that a rise in the water level bridges the separation space and closes the circuit. In either embodiment, a skirt may surround the head element to prevent the signal from being activated by downwardly running water.

4 Claims, 4 Drawing Figures

FLOOD WARNING DEVICE

FIELD OF THE INVENTION

This invention relates generally to danger condition warning devices and more particularly to an alarm for indicating the existence of a flood condition due to the rise of water above a preselected danger level.

BACKGROUND OF THE INVENTION

People occupying residences in areas subject to heavy rainfall or on land subject to periodic flooding remain on a constant vigil to detect rising water. And even people residing in homes erected on land having little likelihood of flooding are fearful of water accumulation in the basements thereof caused by heavy thunderstorms, leaking water mains, broken water pipes or backed-up sewers.

Regardless of whether the residences are located on flood land or on high ground, it is very difficult to obtain flood insurance covering the contents thereof. As a consequence, millions of dollars in uninsured, flood damaged property are lost every year. A rising water detector, placed above the normal water level of a river for regions prone to flooding, or placed in a sump-pump well for non-flood areas, would provide an early indication of rising waters.

It is accordingly one object of the present invention to provide an inexpensive and reliable alarm for alerting the occupants of buildings that water has risen to a preselected, danger level.

Smoke detecting and signalling devices have gained widespread acceptance and are now commonly installed in homes by safety conscious residents. Since these smoke detecting devices are manufactured with the components and circuitry necessary to produce an alarm signal, it would be advantageous to produce the flood alarm of the present invention so as to be connectable to existing smoke detecting devices.

It is therefore another object of the present invention to provide a flood water alarm adapted for operative connection to the terminals of the smoke sensor of a smoke detecting and signalling device.

These and other objects and advantages of this invention will become apparent from the following description of the preferred embodiments of the invention.

BRIEF SUMMARY OF THE INVENTION

An alarm for signalling the rise of water above a preselected danger level. The alarm includes a signalling element adapted for energization in response to a rise in water level above the preselected level, a power source for energizing the signal, a sensor for detecting the rise of water, and wires for effecting a series connection between the signalling element, power source, and sensor. The sensor comprises a head element to which the wire from the signalling element and the wire from the power source are fixedly attached in non-contacting, open circuit relation. Water rising above the preselected level closes the circuit and energizes the signalling element.

In an alternate embodiment, the rising water alarm is adapted for attachment to a smoke detecting and signalling device. Smoke detecting devices commonly include a smoke sensing element, a signal alarm and a source of power, all arranged in a normally open series circuit. A fire related symptom serves to trigger the sensing element to close the circuit and activate the alarm. The rising water alarm includes a pair of elongated current conducting wires, one end of each of the wires connected to one terminal of the sensing element of the smoke detecting device so as to bypass the sensing element. The other ends of the wires are fixedly secured to a wire separation head for spacing the other ends and forming a normally open circuit that is closed when water, rising to the preselected level, bridges the space separating the other ends and activates the signal.

In either the rising-water alarm per se embodiment, or the rising-water alarm for use with the smoke detecting device embodiment, a skirt may surround the head element to prevent the signal from being activated by downwardly running water.

DETAILED DESCRIPTION OF THE DRAWINGS

Figure 1:
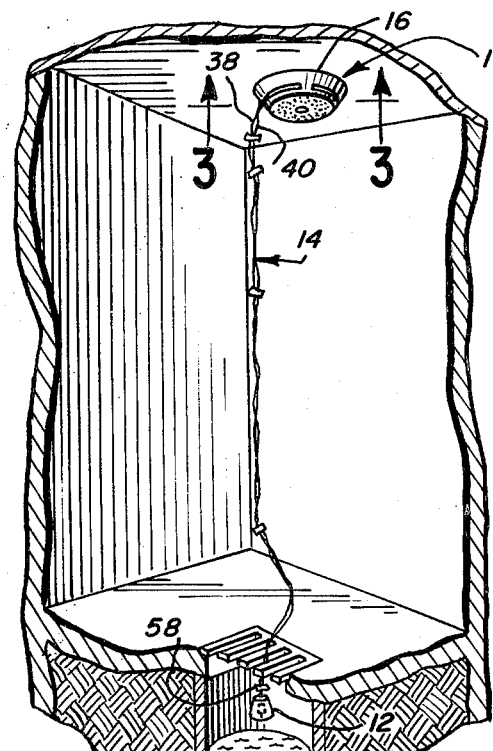
FIG. 1 shows the rising water sensor of the present invention positioned below the basement floor, in the sump-pump well, with elongated wires leading to the remotely located alarm.

Referring now to the drawings, the alarm for signalling a rise in the level of water above a preselected level will be described. The alarm, shown generally as 10 in the drawings, comprises a remote sensor 12, a transmitting line 14 and an alarm housing 16.

Although the alarm housing 16 may take any aesthetically pleasing shape, it is illustrated as including an inverted frusto-conically cover 18 and a bass plate 20. The major components housed within the cover 18 will vary depending on the embodiment of the present invention being used.

The rising water alarm of the present invention, regardless of embodiment includes a current transmitting line 14 defined by a pair of current conducting wires 38 and 40 having oppositely disposed ends. One end, 42 and 44, of each of the wires is connected to specific circuit components depending on the embodiment. The other end, 46 and 48, of each of the wires, 38 and 40, is fixedly connected to a rising water sensor 12, formed as a wire separation head, so as to place the ends 46 and 48 of the wires 38 and 40 in non-contacting relation. The wire separation head 12 is illustrated as a phono-plug 52, but it is to be understood that any non-conductive element capable of maintaining the separation of the wire ends 46 and 48 may be used.

A skirt 54 in the form of a bell-shaped housing surrounds the separated wire ends 46 and 48 on the wire separation head 12 so that downwardly flowing water is unable to trigger the alarm. Apertures, such as 55, are formed in the walls of the skirt 54 to allow air to escape and water to rise within the skirt 54.

The two preferred embodiments will now be described.

SMOKE DETECTING AND SIGNALLING EMBODIMENT

In one, preferred embodiment, the rising-water alarm 10 is adapted for operative connection to most commercially available smoke detecting and signalling devices. Such devices normally include a smoke sensing element 22 having connection terminals 24 and 26, an audio signal alarm 28, a battery or other source of power 30 and an on-off switch 32. These components are mounted on printed circuit boards 34 so as to place the smoke sensing element 22, the signal alarm 28 and the power source 30 in a normally open, series circuit arrangement. The circuit is adapted to be closed and the alarm 28 activated when the smoke sensing element 22 detects the presence of a smoke related hazard.

In adapting the rising water alarm for use with the smoke detecting and signalling embodiment, it is only necessary to connect the one end, 42 and 44, of each of the wires, 38 and 40, to the terminals 24 and 26 of the smoke sensing element 22 of the smoke detecting device. Because the rising water sensor 12 is connected by wires 38 and 40 across the terminals 24 and 26 of the smoke sensing element 22 of the smoke detecting alarm, the rising water sensor 12 is not dependent upon activation of the smoke sensing element to close the circuit. Rather, the sensor 12 forms a normally open series circuit with the power supply 30 and the signal alarm 28. The circuit may be closed and the alarm activated by rising water independently of the activation of the smoke sensing element 22.

RISING WATER ALARM PER SE EMBODIMENT

In describing the rising water alarm per se embodiment, those components which are identical with the components described for the smoke detecting and signalling embodiment will be given identical numbers. The alarm per se includes a signal alarm 28, a source of power 30, a rising water sensor 12 that includes spaced terminals 45 and 47 that are electrically connected to the ends 46 and 48 of the conductor wires 38 and 40.

Figure 2:
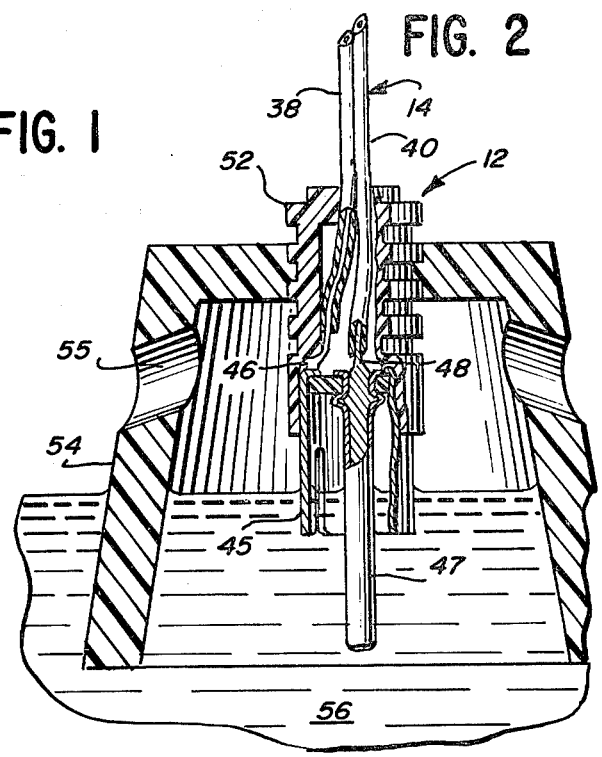
FIG. 2 is an enlarged cross-sectional view taken along line 2—2 of FIG. 1 and showing the connection of the wires to the skirted, wire separation head element of the present invention.
Figure 4:
FIG. 4 is a view illustrating diagrammatically wiring connections for the rising water signalling circuit.
Figure 3:
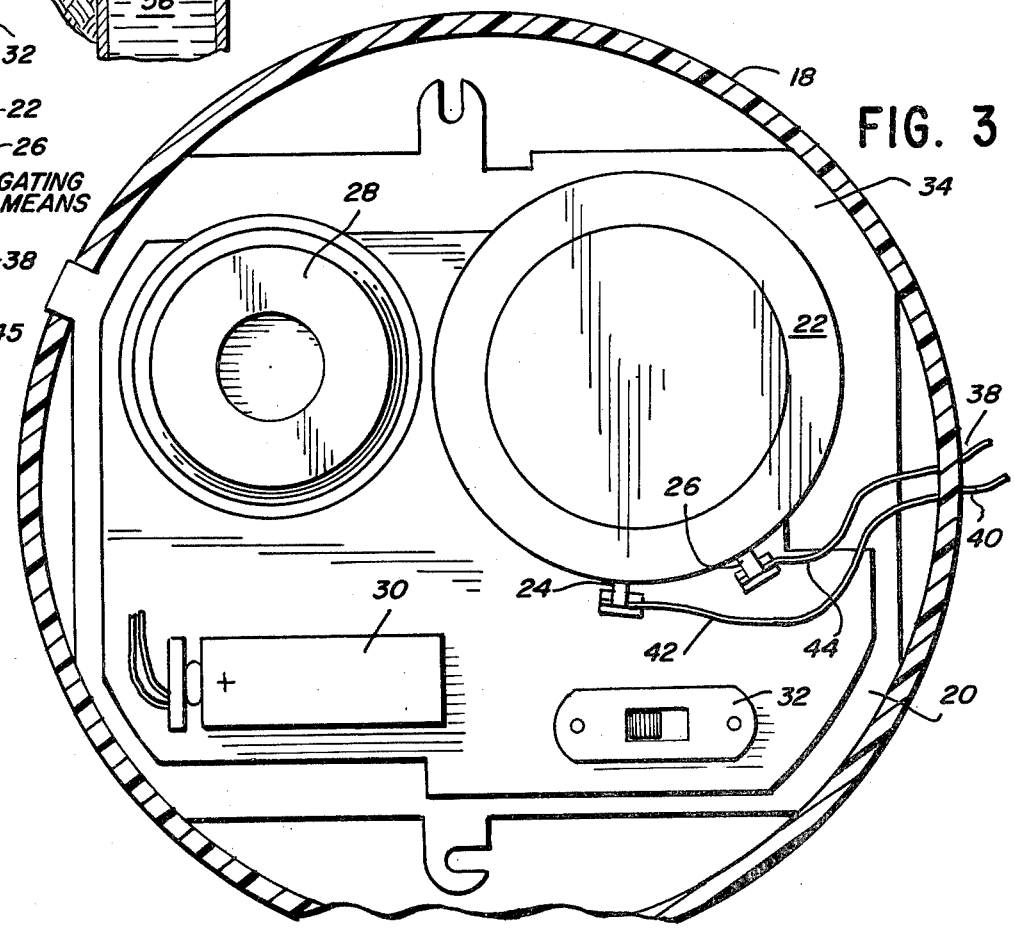
FIG. 3 is an enlarged cross-sectional view taken along line 3—3 of FIG. 1 and showing the major components of most commercially available smoke detecting and signalling devices.

As the smoke sensing element 22 is not present in this embodiment, one end 42, of one of the wires 38 is connected to the power source 30 and one end 44 of the other of the wires 40 is connected to the alarm signal 28. The other ends 46 and 48 of the conductors of wires 38 and 40 are electrically connected to spaced terminals 45 and 47 which are spaced by the structure of separating head 12, so that a normally open circuit is formed. As depicted in FIG. 2, the terminal 47 is an elongated prong-shaped member and the terminal 46 is a circular shield surrounding the pronged-shaped terminal 47.

The wire separation head 12 is adapted for positioning at a preselected danger level by taping as at 58, by tacking (not shown) or by any other well-known method.

It is further within the scope of the present invention to include in the circuit a gating means, such as a capacitor, for providing a broken or interrupted audio or visual signal. This would contrast and distinguish the flood signal from the signal sounded by the smoke detecting device.

OPERATION

The operation of the rising-water alarm 10, of the present invention is the same regardless of the embodiment of alarm being employed. The rising water sensor 12 is secured by taping, tacking or some other convenient method, at a normally dry level, as above the normal water level in a sump-pump well. The alarm 10 is secured at a remote location, from which the inhabitants of the building can be easily warned when the alarm is activated. In the smoke detecting embodiment, the transmitting line 36 is connected at one end, by the wire ends 42 and 44 to the terminals 24 and 26 of the smoke sensing element 22, and in the alarm per se embodiment, by the wire ends 42 and 44 to the power source 30 and the signal 28. The other ends 46 and 48 of the transmitting line are spacedly affixed to the non-conductive, rising water sensor 12.

At such time that the water level reaches or rises above the preselected danger level at which the water sensor 12 is positioned, the water bridges the space between the spaced, exposed sensing terminals 45 and 47 or the space between the wire thereby closing the circuit and activating ends 46 and 48, the alarm 28.

Although the alarm of the present invention has been described in terms of rising flood waters, it should be understood that the alarm has other uses. For instance, it could be employed in the bilge of a ship to detect leaks or in a tank to detect overflow.

While two preferred forms of the invention have been fully described, the invention may be utilized in other forms and environments, so that the purpose of the appended claims is to cover all such forms of devices not disclosed, but which embody the invention disclosed herein.

I claim:
1. An alarm for signalling the rise of water above a preselected danger level, the alarm comprising:
 signal means adapted to emit an output signal when energized;
 a power means arranged to energize the signal means when a circuit between the power means and signal means is completed;
 a combination transmitting line and a sensor for presence of water comprising a pair of elongated electrical conductors, one in electric connection at one end to said signal means and the other in electrical connection at one end to said power means, and the other ends of said elongated electrical conductors being connected to spaced, exposed, sensing terminals that are adapted to be selectively positioned to be exposed to water to be sensed, but only to be responsive to a rising water level to establish a circuit therebetween and through said water whereby to sound the alarm, downwardly opening skirt means surrounding said exposed sensing terminals and extending downwardly below said terminals, for preventing downwardly flowing water from bridging the space between said sensing terminals which could falsely signal a danger condition, and vent means in said skirt permitting rising water to enter said skirt and to electrically bridge the space between said sensing terminals to cause emission of a sound signal.
2. For use with a smoke detector which includes means for sensing smoke or other fire-related symptoms, the smoke sensing means having a pair of terminals, signal means for emitting an output signal indicative of the existence of a fire-related sympton, power means for energizing the signal means, and smoke circuit means connecting the smoke sensing means, the signal means and the power means in a normally open, series circuit, the improvement comprising, in combination:

- a transmitting line defined by a pair of elongated conducting wires, the conducting wires including oppositely disposed ends, one of the ends of each one of the pair of conducting wires being adapted for operative connection to the terminals of the smoke sensing means;
- means for sensing a rise in the level of water, the rise-in-water-level sensing means including a wire separation head formed of a non-conductive material and a pair of spaced, electrically conductive, sensing terminals carried thereon;
- the other end of each of the conducting wires being fixedly secured to the wire separation head in non-contacting, spaced, relation, and each being electrically connected to one of said pair of sensing terminals, so that a rise in the water above a preselected danger level serves to bridge the space separating the sensing terminals, thereby closing the circuit and producing an alarm signal;
- and a downwardly opening skirt means, secured to said non-conductive separation head, and being constructed to surround and be spaced from said sensing terminals, so as to prevent downwardly flowing water from bridging the space between said sensing terminals.

3. A device as in claim 2, wherein the output of the signal means for rising water is caused to be perceptively distinguishable from the output of the signal means for smoke detection.

4. A device as in claim 3, wherein gating means is used in the circuit that includes the sensing terminals to provide an interrupted output signal for the rising water alarm.

* * * * *